United States Patent
Sabharwal et al.

(10) Patent No.: US 10,671,511 B2
(45) Date of Patent: Jun. 2, 2020

(54) AUTOMATED BUG FIXING

(71) Applicant: HCL Technologies Limited, Noida (IN)

(72) Inventors: Navin Sabharwal, Noida (IN); Amit Agrawal, Noida (IN)

(73) Assignee: HCL Technologies Limited, Noida, Uttar Pradesh (IN)

( * ) Notice: Subject to any disclaimer, the term of this patent is extended or adjusted under 35 U.S.C. 154(b) by 0 days.

(21) Appl. No.: 16/013,848

(22) Filed: Jun. 20, 2018

(65) Prior Publication Data

US 2019/0391904 A1    Dec. 26, 2019

(51) Int. Cl.
| | |
|---|---|
| G06F 9/44 | (2018.01) |
| G06F 11/36 | (2006.01) |
| G06N 3/08 | (2006.01) |
| G06F 8/65 | (2018.01) |

(52) U.S. Cl.
CPC .......... *G06F 11/3636* (2013.01); *G06F 8/65* (2013.01); *G06F 11/3612* (2013.01); *G06F 11/3688* (2013.01); *G06N 3/08* (2013.01)

(58) Field of Classification Search
CPC .................................................. G06F 11/3636
See application file for complete search history.

(56) References Cited

U.S. PATENT DOCUMENTS

| | | | | |
|---|---|---|---|---|
| 6,334,121 | B1 * | 12/2001 | Primeaux | G06F 21/552 706/52 |
| 7,185,367 | B2 * | 2/2007 | Munson | G06F 11/3612 714/E11.209 |
| 7,614,043 | B2 | 11/2009 | Ognev et al. | |
| 8,572,560 | B2 | 10/2013 | Drissi et al. | |
| 8,656,362 | B2 | 2/2014 | Balasubramanian | |
| 8,732,674 | B1 | 5/2014 | Agha | |
| 9,092,211 | B2 | 7/2015 | Ng et al. | |

(Continued)

FOREIGN PATENT DOCUMENTS

WO    2015191737 A1    12/2015

OTHER PUBLICATIONS

Sahil Bhatia, Rishabh Singh "Automated Correction for Syntax Errors in Programming Assignments using Recurrent Neural Networks" Mar. 19, 2016.

*Primary Examiner* — Hang Pan
(74) *Attorney, Agent, or Firm* — HM Law Group LLP; Vani Moodley, Esq.

(57) ABSTRACT

Disclosed is a system for removing bugs present in a software code. A determination module determines a usage pattern of a software code by using an Artificial Neural Network (ANN) technique. A comparison module compares the usage pattern with a set of pre-stored usage patterns of software applications similar to the software code. An execution module executes a set of test suites, on the software code, associated to at least one software application of the software applications, when a usage pattern of the at least one software application is matched with the usage pattern of the software code. An identification module identifies a code snippet comprising the bug. A recommendation module recommends a code patch, corresponding to the code snippet, from a ranked list of code patches determined by a Deep RNN technique. Further, a replacement module replaces the code snippet with the code patch thereby removing the bug.

13 Claims, 6 Drawing Sheets

(56) References Cited

U.S. PATENT DOCUMENTS

| | | | |
|---|---|---|---|
| 9,378,014 B2 | 6/2016 | Wilson et al. | |
| 2010/0146325 A1* | 6/2010 | John | G06F 11/0793 |
| | | | 714/3 |
| 2014/0149435 A1* | 5/2014 | Sisman | G06F 11/362 |
| | | | 707/751 |
| 2015/0161522 A1* | 6/2015 | Saon | G06N 3/08 |
| | | | 706/12 |
| 2015/0234730 A1* | 8/2015 | Puthuff | G06F 11/3636 |
| | | | 717/128 |
| 2019/0012254 A1* | 1/2019 | Gupta | G06F 11/3476 |

* cited by examiner

AUTOMATED BUG FIXING

PRIORITY INFORMATION

This patent application does not claim priority from any application.

TECHNICAL FIELD

The present subject matter described herein, in general, relates to a field of software development and more particularly to removing a bug present in a software code by implementing Artificial Neural Network (ANN), Deep Recurrent Neural Network (Deep RNN), and Deep Convolution Neural Network (Deep CNN) techniques.

BACKGROUND

In the field of software development at most care is taken to deploy an error free software in an environment. To capture the error in the software code, every line of the software code is tested by a team of individuals. However, there is always an element of human error involved while performing testing, thus deployment of the error free software is always unachievable. To reduce the human element, conventional system and methodologies has automated the testing by executing pre-defined test suites on the software code. It is important to note that the pre-defined test suites are limited to the programming language of the software code. In other words, if the pre-defined test suites are written to test a software code in one programming language, the same pre-defined test suites may not applicable to test another software application written in different programming language. In addition, the pre-defined test suites are also created by the team of individuals, thus the deployment of the software code may not be error free.

SUMMARY

Before the present systems and methods, are described, it is to be understood that this application is not limited to particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for removing a bug present in a software code and the concepts are further described below in the detailed description. This summary is not intended to identify essential features of the claimed subject matter nor is it intended for use in determining or limiting the scope of the claimed subject matter.

In one implementation, a method for removing a bug present in a software code is disclosed. In order to remove the bug, initially, a usage pattern of a software code may be determined by using an Artificial Neural Network (ANN) technique. Upon determining the usage pattern, the usage pattern may be compared with a set of pre-stored usage patterns of software applications similar to the software code. In one aspect, the usage pattern may be compared by using a Deep Convolution Neural Network (Deep CNN) based transfer learning. Subsequently, a set of test suites, associated to at least one software application of the software applications, may be executed on the software code when a usage pattern of the at least one software application is matched with the usage pattern of the software code. Upon executing the set of test suites, a code snippet comprising a bug in the software code may be identified. In order to do so, the bug present in a line of code of the software code may be localized based on a stack trace. In one aspect, the bug may be localized upon determination of an occurrence of the bug in the software code. It is to be understood that the occurrence of the bug is determined based on execution of the set of test suites. Further, the code snippet corresponding to the line of code may be determined by using a Deep Recurrent Neural Network (Deep RNN) technique. Furthermore, a code patch corresponding to the code snippet may be recommended from on a ranked list of code patches determined by the Deep RNN technique. Upon recommendation of the code patch, the code snippet may be replaced with the code patch thereby removing the bug present in the software code. In another aspect, the aforementioned method for removing a bug present in a software code may be performed by a processor using programmed instructions stored in a memory.

In another implementation, a system for removing a bug present in a software code is disclosed. The system may comprise a processor and a memory coupled to the processor. The processor may execute a plurality of modules present in the memory. The plurality of modules may comprise a determination module, a comparison module, an execution module, an identification module, a recommendation module and a replacement module. The determination module may determine a usage pattern of a software code by using an Artificial Neural Network (ANN) technique. Further to determining the usage pattern, the comparison module may compare the usage pattern with a set of pre-stored usage patterns of software applications similar to the software code. In one aspect, the usage pattern may be compared by using a Deep Convolution Neural Network (Deep CNN) based transfer learning. Meanwhile, the execution module may execute a set of test suites, on the software code, associated to at least one software application of the software applications, when a usage pattern of the at least one software application is matched with the usage pattern of the software code. Subsequently, the identification module may identify a code snippet comprising a bug in the software code. In order to do so, the identification module may localize the bug present in a line of code of the software code based on a stack trace. In one aspect, the bug may be localized upon determination of an occurrence of the bug in the software code. It is to be noted that the occurrence of the bug is determined based on execution of the set of test suites. Further, the identification module may determine the code snippet corresponding to the line of code by using a Deep Recurrent Neural Network (Deep RNN) technique. Furthermore, the recommendation module may recommend a code patch, corresponding to the code snippet, from a ranked list of code patches determined by the Deep RNN technique. Upon recommendation, the replacement module may replace the code snippet with the code patch thereby removing the bug present in the software code.

In yet another implementation, non-transitory computer readable medium embodying a program executable in a computing device for removing a bug present in a software code is disclosed. The program may comprise a program code for determining a usage pattern of a software code by using an Artificial Neural Network (ANN) technique. The program may further comprise a program code for comparing the usage pattern with a set of pre-stored usage patterns of software applications, similar to the software code. In one aspect, the usage pattern may be compared by using a Deep Convolution Neural Network (Deep CNN) based transfer learning. The program may further comprise a program code for executing a set of test suites, on the software code, associated to at least one software application of the software applications, when a usage pattern of the at least one software application is matched with the usage pattern of the software code. The program may further comprise a program code for identifying a code snippet comprising a bug in the software code. In order to do so, the bug present in a line of code of the software code may be localized based on a stack trace. In one aspect, the bug may be localized upon determination of an occurrence of the bug in the software code. It is to be understood that the occurrence of the bug is determined based on execution of the set of test suites. Further, the code snippet corresponding to the line of code may be determined by using a Deep Recurrent Neural Network (Deep RNN) technique. The program may further comprise a program code for recommending a code patch corresponding to the code snippet from a ranked list of code patches determined by the Deep RNN technique. The program may further comprise a program code for replacing the code snippet with the code patch thereby removing the bug present in the software code.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "determining," "comparing," "executing," "identifying," "localizing," "recommending," and "replacing," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention tackles limitations of existing system to remove bugs from a software code. The present invention removes the bugs based on a usage pattern of the software code. To do so, initially, the usage pattern of the software code may be determined by using Artificial Neural Network (ANN) technique. It is to be noted that prior to deployment of the software code, the system may be trained only on set of pre-stored usage patterns of software applications similar to the software code. In one embodiment, the set of pre-stored usage patterns from the at least one software application coded in different programming language may be gathered with the help of a plurality of Artificial Intelligence (AI) based agents. It is important to note that each AI based agent, from the plurality of AI based agents, utilizes concept of "Transfer Learning" to use model parameters which have been trained on usage patterns of similar type of applications via other AI based agents. The usage pattern may be compared with the set of pre-stored usage patterns. It is important to note that the comparison of the usage pattern and the set of pre-stored usage patterns may be based on a plurality of attributes including, but not limited to, number of requests in a predefined time, utilization of resources, number of threads, and number of connections created in the predefined time.

Subsequent to the comparison, a set of test suites associated to at least one software application of the software applications may be executed on the software code, when a usage pattern of the at least one software application is matched with the usage pattern of the software code. Further, a code snippet comprising the bug may be identified based on a stack trace of the software code. Furthermore, a code snippet corresponding to the bug may be determined by using a Deep Recurrent Neural Network (Deep RNN) technique. The Deep RNN technique provides a ranked list of code patches similar to the code snippet. Upon determining the code snippet, a code patch from the ranked list of code patches may be recommended. Subsequently, the code patch may be translated into the programming language of the software code. After translation, the code snippet may be replaced with the code patch, thereby remove bugs present in the software code.

In one embodiment, during an initial training process, the system may be exposed to a new environment to train the AI based agents. The system may use a reinforcement learning technique. The reinforcement learning technique penalizes the system by deduction of reward points for each incorrect recommendation of the set of test suites for identifying the bug. On the other hand, the reinforcement learning technique rewards the system by awarding reward points for each correct recommendation of the set of test suites.

In another embodiment, the AI based agents may learn from one or more bugs discovered and reported by a user.

The AI based agents may analyse usage patterns of software applications at an instant when one or more bugs are logged in the system. In addition, the AI based agents may generate a plurality of test suites corresponding to the one or more bugs. Based on the plurality of test suites, the system may train on its own by using the reinforced learning system if the same type of usage pattern occurs in similar type of software applications.

Figure 1:
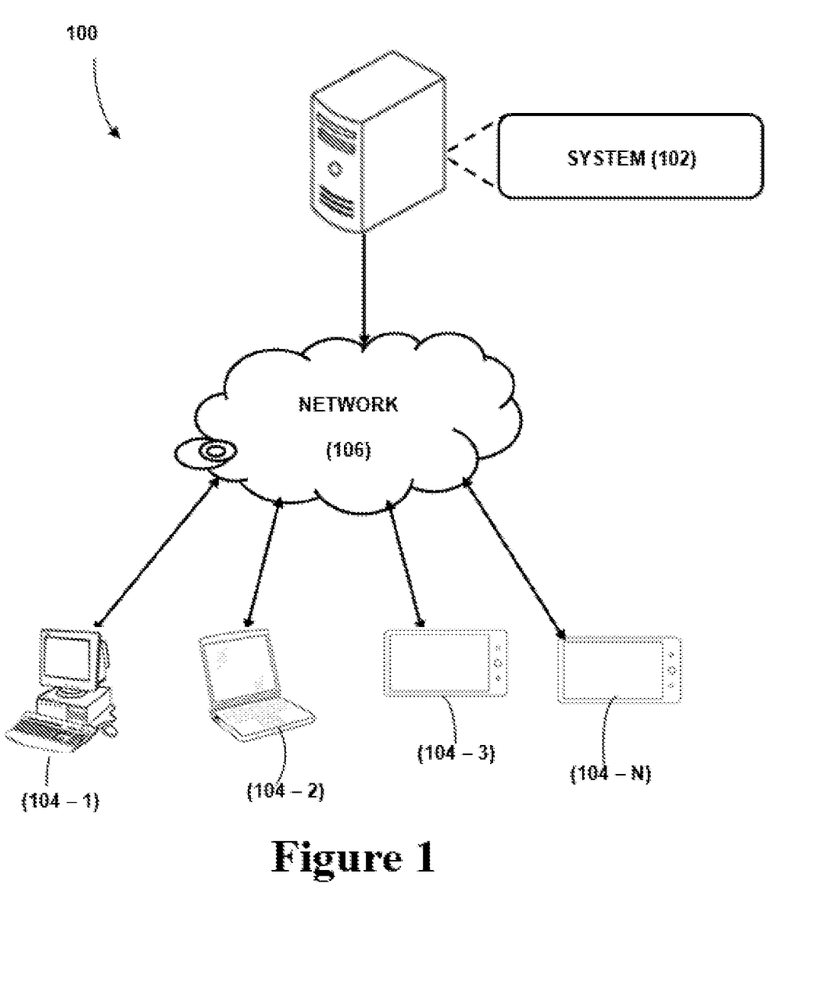
FIG. 1 illustrates a network implementation of a system for removing a bug present in a software code, in accordance with an embodiment of the present subject matter.

Referring now to FIG. 1, a network implementation 100 of a system 102 for removing a bug present in a software code is disclosed. In order to remove the bug, initially, the system 102 may determine a usage pattern of a software code by using an Artificial Neural Network (ANN) technique. Further to determining the usage pattern, the system 102 may compare the usage pattern with a set of pre-stored usage patterns of software applications similar to the software code. In one aspect, the usage pattern may be compared by using a Deep Convolution Neural Network (Deep CNN) based transfer learning. Meanwhile, the system 102 may execute a set of test suites, on the software code, associated to at least one software application of the software applications, when a usage pattern of the at least one software application is matched with the usage pattern of the software code. Subsequently, the system 102 may identify a code snippet comprising a bug in the software code. In order to do so, the system 102 may localize the bug present in a line of code of the software code based on a stack trace. In one aspect, the bug may be localized upon determination of an occurrence of the bug in the software code. It is to be noted that the occurrence of the bug is determined based on execution of the set of test suites. Further, the system 102 may determine the code snippet corresponding to the line of code by using a Deep Recurrent Neural Network (Deep RNN) technique. Furthermore, the system 102 may recommend a code patch, corresponding to the code snippet, from a ranked list of code patches determined by the Deep RNN technique. Upon recommendation, the system 102 may replace the code snippet with the code patch thereby removing the bug present in the software code.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
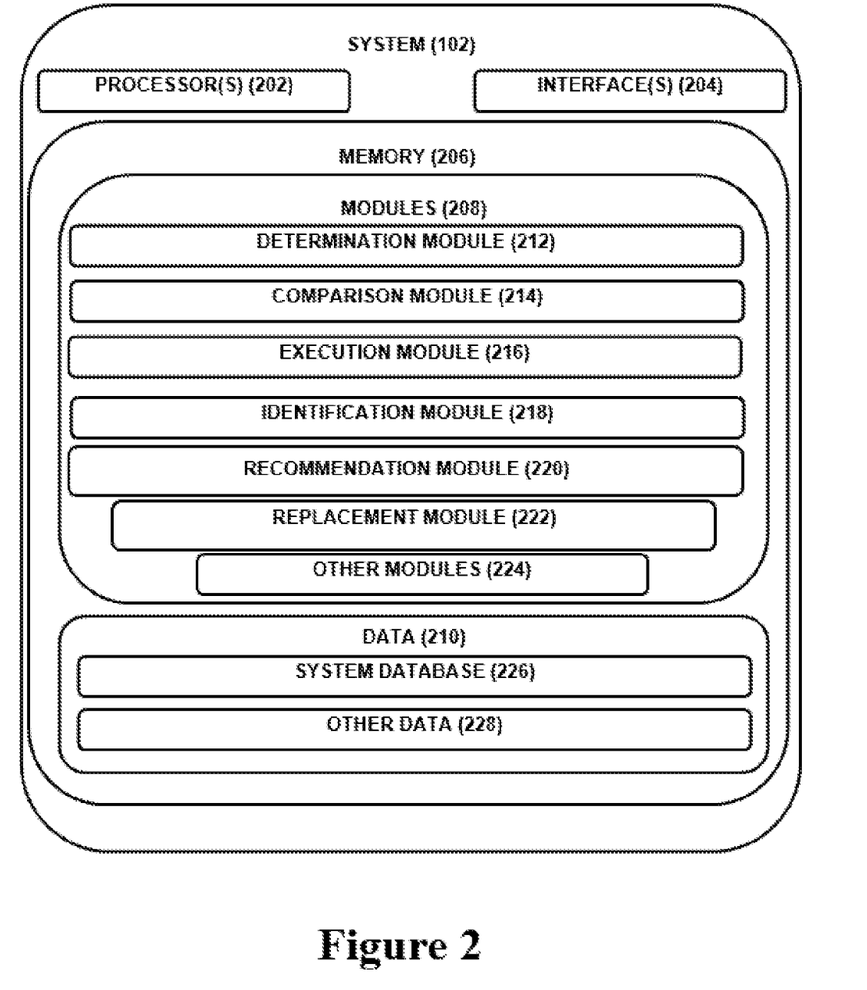
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a determination module 212, a comparison module 214, an execution module 216, an identification module 218, a recommendation module 220, a replacement module 222 and other modules 224. The other modules 224 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 226 and other data 228. The other data 228 may include data generated as a result of the execution of one or more modules in the other modules 224.

As there are various challenges observed in the existing art, the challenges necessitate the need to build the system 102 for removing the bug present in the software code. In order to remove the bug, at first, a user may use the client device 104 to access the system 102 via the I/O interface 204. The user may register them using the I/O interface 204 in order to use the system 102. In one aspect, the user may access the I/O interface 204 of the system 102. The system 102 may employ the determination module 212, the comparison module 214, the execution module 216, the identification module 218, the recommendation module 220, and the replacement module 222. The detail functioning of the modules is described below with the help of figures.

The present system 102 removes a bug present in a software code. To do so, initially, the determination module 212 determines a usage pattern of the software code by using an Artificial Neural Network (ANN) technique. It is to be noted that the usage pattern is specific to one developer and may vary for another developer. The usage pattern includes information about data type, data structures, nested conditional loops, output statements, and input statements and a like.

Further to determining the usage pattern, the comparison module 214 compares the usage pattern with a set of pre-stored usage patterns of software applications similar to the software code. The usage pattern is compared with the set of pre-stored usage patterns based on a plurality of attributes including, but not limited to, number of requests in a predefined time, utilization of resources, number of threads, and number of connections created in the predefined time. The usage pattern may be compared with the set of pre-stored usage patterns by using a Deep Convolution Neural Network (Deep CNN) based transfer learning. In one implementation, the comparison module 214 may create a plurality of Artificial Intelligence (AI) based agents to gather the set of pre-stored usage patterns from the at least one software application coded in different programming language. Example of the different programming languages may include, but not limited to, C, C++, Java, spring, C #, dot net, perl, python, and javascript.

Upon comparing the usage patterns, the execution module 216 executes a set of test suites on the software code when a usage pattern of the at least one software application is matched with the usage pattern of the software code. The set of test suites may be associated to at least one software application of the software applications. The set of test suites may be pre-stored in the system database 226. In one implementation, the plurality of AI based agents may gather the set of test suites from the software applications written in different programming languages based on the usage pattern.

After executing at least one test suite from the set of test suites, the identification module 218 may identify a code snippet comprising a bug in the software code. In order to do so, the identification module 218 localizes the bug present in a line of code of the software code based on a stack trace. In one aspect, the bug may be localized upon determination of an occurrence of the bug in the software code. It is to be noted that the occurrence of the bug is determined based on execution of the set of test suites. Further, the identification module 218 determines the code snippet corresponding to the line of code by using a Deep Recurrent Neural Network (Deep RNN) technique.

Figure 3:
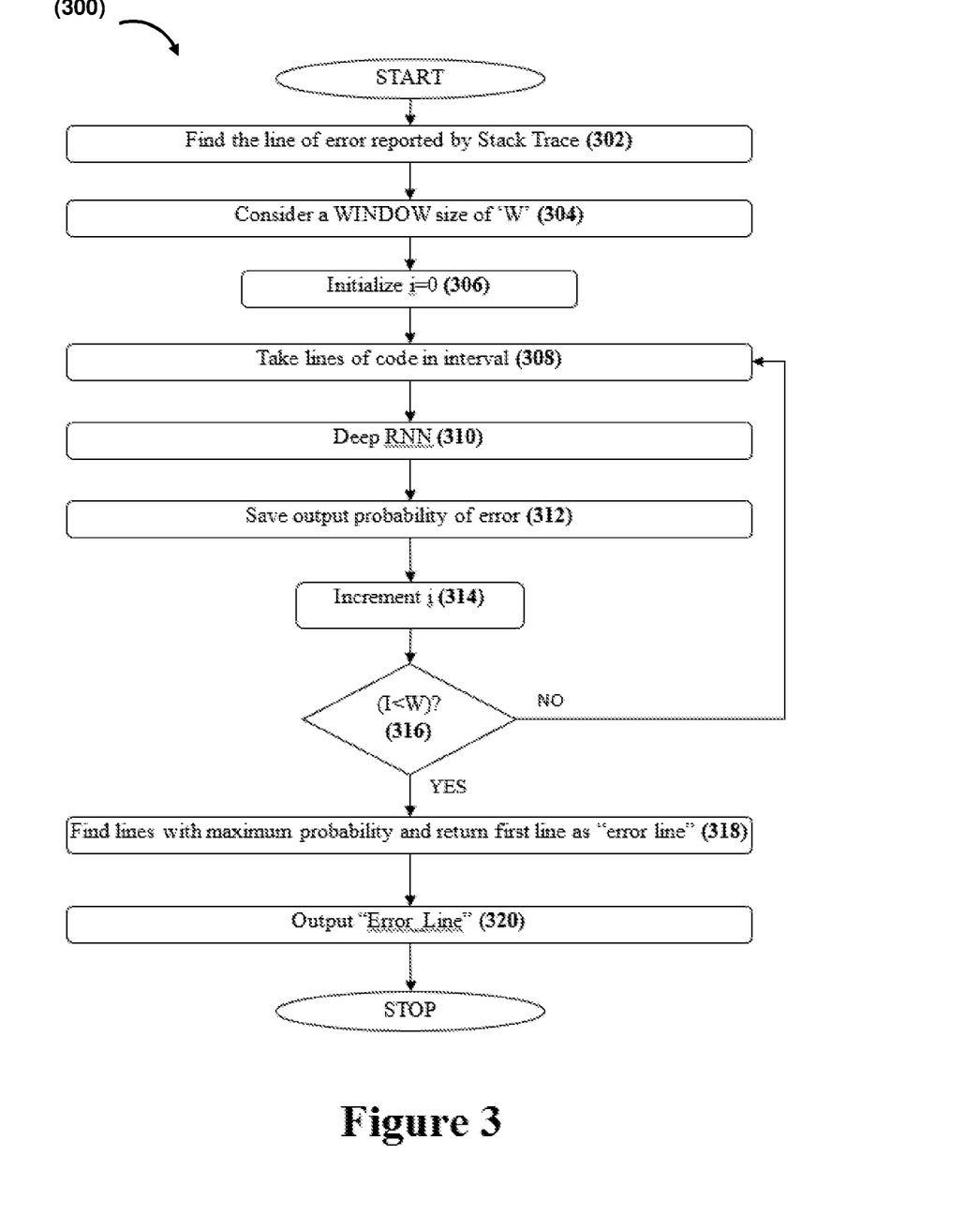
FIG. 3 illustrates a workflow of the system for localizing bug present in the software code, in accordance with an embodiment of the present subject matter.

In order to elucidate further consider FIG. 3 illustrating a workflow 300 of the system 102 for localizing the bug present in the software code, in accordance with an embodiment of the present subject matter. At block 302, the identification module 218 finds the line of code comprising the bug. The line of code is reported by the stack trace of the software code. It is observed that the bug is not present in the line of code but in lines prior to the line of code. To elucidate further, consider below code snippet—

1. int a=1;
2. . . .
3. //Some processing
4. . . .
5. a=0;
6. int c=b/a;
7. System.out.println(c);

Upon executing a test suite on the above code snippet, an ArithmeticException error at line 6 would be reported. The ArithmeticException is a result of divide by zero statement at the line 6. However, upon further analysis it is understood that the occurrence of the bug is not at the line 6 but at the line 5 where the 'a' is assigned '0'. To identify the actual line of code comprising the bug, the identification module 218, at block 304, creates a window of size 'w' comprising lines of code to be analysed for identifying the bug. At block 306, the identification module 218 initialises window size to '0'. At block 308, the identification module 218 initiates recursive analysis of the window starting from the line of code reported by the stack trace. To identify the bug, at block 310, the identification module 218 may compute probability of occurrence of the bug using Deep RNN technique. At block 312, probability of occurrence of the bug associated with each line, of the lines of code, is stored in the system database 226. At block 314, identification module 218 shifts the counter to the next line present in the window for computing the probability. At block 316, the identification module 218 ensures that the probability of the occurrence of the bug is computed for each line present in the window. At block 318, the line having maximum probability of the occurrence of the bug may be identified as the line of code comprising the bug. At block 320, the line of code may be identified. Further, the identification module 218 may determine the code snippet, comprising the line of code, based on the Deep RNN technique.

Now referring again to FIG. 2. The recommendation module 220, after identifying the code snippet, recommends a code patch, corresponding to the code snippet, from a ranked list of code snippets determined by the Deep RNN technique. The ranked list of code snippets may be gathered by the AI based agents.

The AI based agents utilize the Deep RNN technique to gather the ranked list of code snippets from a search space. The search space is a repository comprising a set of code patches written in different programming languages. In one implementation, the system 102 maps the set of code patches to the search space by using a Deep Convolution Neural Network (Deep CNN) technique and the Deep RNN technique. The Deep CNN technique takes the lines of code of the bug and recommends the set of code patches with varying probability of success for the code snippet. Based on the output of the Deep CNN technique, the recommendation module 220 recommends the ranked list of code patches for the code snippet.

It is to be noted that each code patch, from the set of code patch, is mapped in the search space based on the usage pattern. In other words, the one or more code patches, from the set of code patches, with similar semantic meanings may be mapped together as one cluster. In one aspect, the set of code patches may be gathered from multiple sources and projects available over internet. Example of the sources may include, but not limited to, Github, SourceForge, Open CV, and Stack Overflow. In other aspect, the code patch may be gathered from at least one of blogs, social media, project repositories, and release notes.

Upon recommendation, the replacement module 222 may translate the code patch into the programming language of the software code by using an auto encoder. The Auto encoder is based on the transfer learning and the machine translation technique. The Auto encoder translates code patch by utilizing combinations of the set of code patches and scenarios from one language to other. After translating the code patch, the replacement module 224 replaces the code snippet with the code patch thereby removing the bug present in the software code.

In order to remove the bug present in the software code it is important to execute test suites on the code snippet. The present system 102 utilizes a reinforcement learning technique to identify the test suites corresponding to the code snippet. To elucidate further, consider FIGS. 4a, and 4b comprising a workflow 400 of the system 102 for identifying a test suite corresponding to the code snippet by using reinforcement learning, in accordance with an embodiment of the present subject matter. At block 402, the determination module 212 determines usage pattern of the software code based on one or more attributes received. The determination module 212 performs the ANN technique to determine the usage pattern of the software code. In one embodiment, the usage pattern may be defined as quantifying the one or more attributes to compute a similarity score. At block 404, based on the usage pattern, the determination module 212 may create a cluster of software applications with similar usage pattern. The cluster of software applications may comprise software code written in same or different programming language of the software code. At block 406, the determination module 212 performs transfer learning. For transfer learning, initially, the determination module 212 considers each cluster as a class and uses the Deep CNN as a classifier for each class.

Figure 4A:
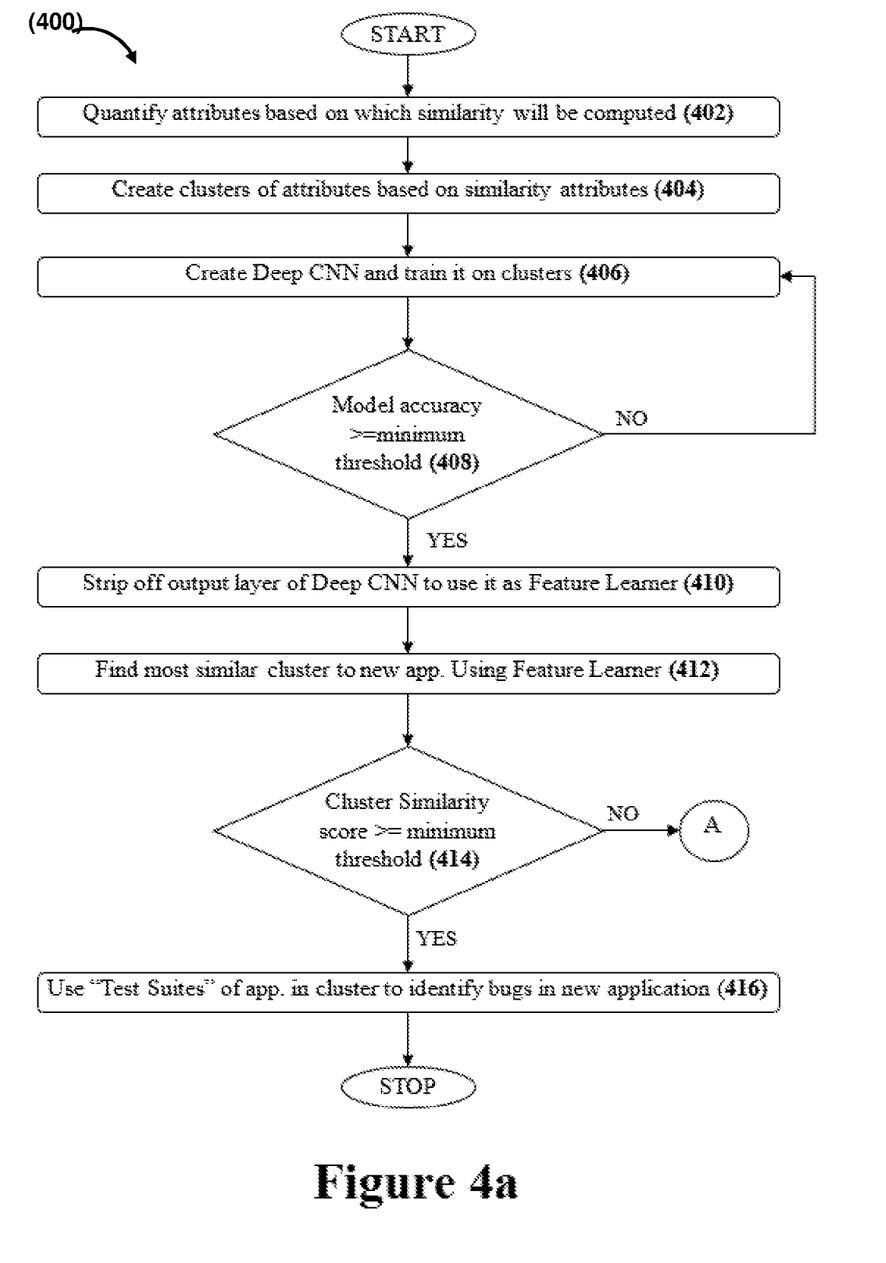
FIGS. 4a, and 4b illustrate a workflow of the system for identifying a test suite corresponding to the code snippet by using reinforcement learning, in accordance with an embodiment of the present subject matter.
Figure 4B:
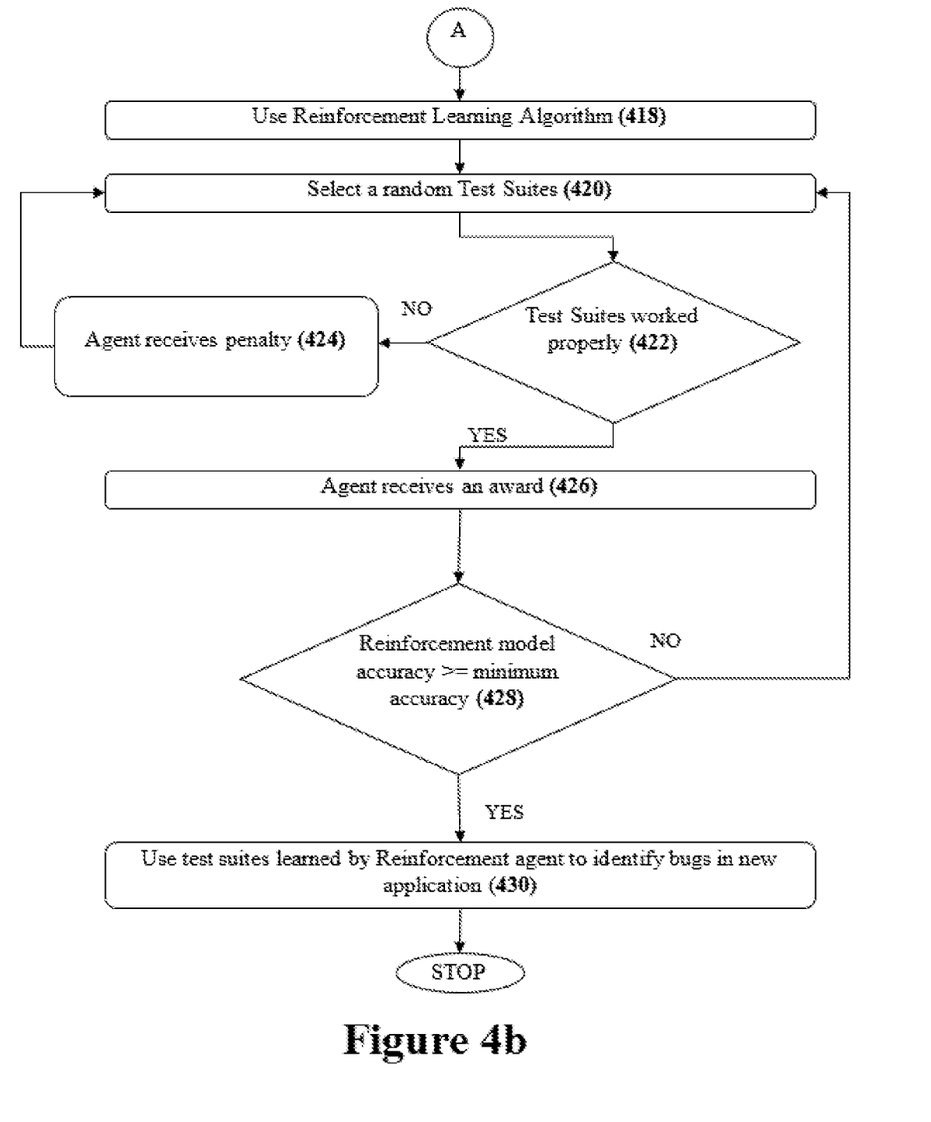

At block 408, the comparison module 214 compares model accuracy of the system 102 with a predefined minimum threshold. The predefined minimum threshold is calculated by running the system 102 for different values of threshold and selecting an optimal threshold value. The model accuracy refers to accuracy of the system 102 to identify the cluster (or application type) of the usage pattern. When the model accuracy is less than the predefined minimum threshold, the system 102 may undergo training again. At block 410, when the model accuracy is greater than the predefined minimum threshold, a plurality of features is extracted by using the Deep CNN. The plurality of features may indicate a class associated with the cluster of software applications. At block 412, the cluster may be identified based on the plurality of features. In one embodiment, the cluster may be an input to a reinforcement learning algorithm implemented by the reinforcement learning technique.

At block 414, the comparison module 214 compares a similarity score of each cluster with the predefined minimum threshold. The similarity score is based on mapping of each cluster with the usage pattern. The predefined minimum threshold decides whether a usage pattern associated with the cluster is similar to the usage pattern.

When the similarity score is greater than the predefined minimum threshold, at block 416, the execution module 216 executes a set of test suites, on the software code, associated to at least one software application of the software applications. The set of test suites are selected from the cluster.

When the similarity score is less than the predefined minimum threshold, at block 418, the execution module 218 implements the reinforcement learning algorithm with the ANN technique. At block 420, the execution module 216 utilizes AI based agents, based on the reinforcement learning technique, to select random test suites for executing on the software code. At block 422, execution of the random test suites is verified. It is to be noted that the verification of the test suites indicates applicability of the test suites for the software code. When the test suites are found not applicable for the software code, at block 424, the execution module 216 penalizes the AI based agents by imposing penalty. The penalty imposed on the AI based agents indicates non-applicability of the test suites selected for the software code. Once the AI based agents are penalized, new set of test suites may be selected by the AI based agents. In one implementation, penalty may be imposed by raising a ticket, assigning a flag, hot listing, and alike.

When the test suites are found applicable for the software code, at block 426, the execution module 216 rewards the AI based agents for the applicability of the test suits. Once rewarded, the AI based agents may select plurality of test suites similar to the test suits. At block 428, the execution module 216 compares the accuracy of the test suites based on the minimum threshold. At block 430, when the test suites exceed the minimum threshold, the execution module 216 executes the test suite on the software code to identify the bug in the software code deployed in a new environment.

Figure 5:
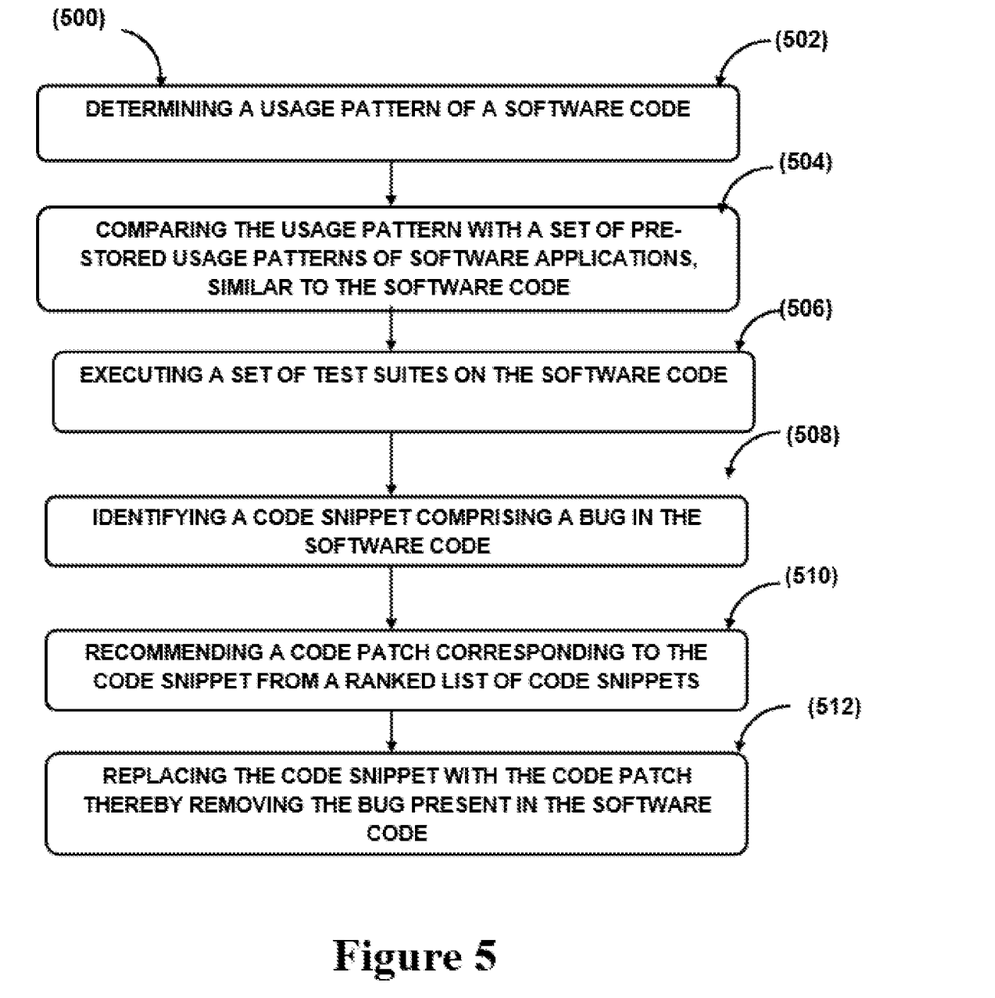
FIG. 5 illustrates a method for removing a bug present in a software code, in accordance with an embodiment of the present subject matter.

Referring now to FIG. 5, a method 500 for removing bug present in a software code is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 for removing bug present in a software code is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented as described in the system 102.

At block 502, a usage pattern of a software code may be determined. In one implementation, the usage pattern of a software code may be determined by using an Artificial Neural Network (ANN) technique by a determination module 212.

At block 504, the usage pattern may be compared with a set of pre-stored usage patterns of software applications similar to the software code. In one aspect, the usage pattern may be compared by using a Deep Convolution Neural Network (Deep CNN) based transfer learning. In one implementation, the usage pattern may be compared with a set of pre-stored usage patterns of software applications by a comparison module 214.

At block 506, a set of test suites may be executed on the software code associated to at least one software application of the software applications, when a usage pattern of the at least one software application is matched with the usage pattern of the software code. In one implementation, the set of test suites may be executed on the software code by an execution module 216.

At block 508, a code snippet comprising a bug in the software code may be identified. In one implementation, the code snippet comprising a bug in the software code may be identified by an identification module 218.

At block 510, a code patch corresponding to the code snippet may be recommended from on a ranked list of code snippets determined by the Deep RNN technique. In one implementation, the code patch corresponding to the code snippet may be recommended by using a recommendation module 220.

At block 510, the code snippet may be replaced with the code patch thereby removing the bug present in the code. In one implementation, the code snippet may be replaced with the code patch by using a replacement module 224.

Exemplary embodiments discussed above may provide certain advantages. Though not required to practice aspects of the disclosure, these advantages may include those provided by the following features.

Some embodiments enable a system and a method to identify bug present in the code.

Some embodiments enable a system and a method to execute a set of test suites determined from software codes written in different languages as that of the software code.

Some embodiments enable a system and a method to recommend a ranked list of code snippets from a search space comprising one or more code snippets written in different languages.

Some embodiments enable a system and a method to create an Artificial Intelligence (AI) based agents to gather set of pre-defined usage patterns from the at least one software application coded in different programming language.

Some embodiments enable a system and a method to train by using reinforcement learning technique.

Some embodiments enable a system and a method to find the code patch in a search space based on the usage patterns associated with a code snippet.

Although implementations for methods and systems for removing bugs present in the software code have been described in language specific to structural features and/or methods, it is to be understood that the appended claims are not necessarily limited to the specific features or methods described. Rather, the specific features and methods are disclosed as examples of implementations for removing bugs present in the software code.

The invention claimed is:

1. A method for removing a bug present in a software code, the method comprising:
    determining, by a processor, a usage pattern of a software code by using an Artificial Neural Network (ANN) technique;
    comparing, by the processor, the usage pattern with a set of pre-stored usage patterns of software applications, similar to the software code, wherein the usage pattern is compared by using a Deep Convolution Neural Network (Deep CNN) based transfer learning;
    executing, by the processor, a set of test suites, on the software code, associated to at least one software application of the software applications, when a usage pattern of the at least one software application is matched with the usage pattern of the software code;
    identifying, by the processor, a code snippet comprising a bug in the software code by,
        localizing the bug present in a line of code, of the software code, based on a stack trace, wherein the bug is localized upon determination of an occurrence of the bug in the software code, and wherein the occurrence of the bug is determined based on execution of the set of test suites, and
        determining the code snippet corresponding to the line of code by using a Deep Recurrent Neural Network (Deep RNN) technique;
    recommending, by the processor, recommending a code patch, corresponding to the code snippet, from a ranked list of code patches determined by the Deep RNN technique; and
    replacing, by the processor, the code snippet with the code patch thereby removing the bug present in the software code.

2. The method of claim 1 further comprises creating a plurality of Artificial Intelligence (AI) based agents to gather the set of pre-stored usage patterns from the at least one software application coded in different programming language.

3. The method of claim 1, wherein the usage pattern is compared with the set of pre-stored usage patterns based on a plurality of attributes comprising number of requests in a predefined time, utilization of resources, number of threads, and number of connections created in the predefined time.

4. The method of claim 1 further comprises mapping the set of code patches to a search space by using the Deep Convolution Neural Network (Deep CNN) and the Deep Recurrent Neural Network (Deep RNN) techniques to find the set of code patches based on the usage pattern, wherein the search space is a repository comprising the set of code patches written in different programming languages.

5. The method of claim 1, wherein the recommendation of the code patch is facilitated by using a reinforcement learning.

6. The method of claim 1 further comprises translating the code patch into the programming language of the software code by using an auto encoder based on the transfer learning and the machine translation technique.

7. A system for removing a bug present in a software code, the system comprising:
    a processor; and
    a memory coupled to the processor, wherein the processor is capable of executing a plurality of modules stored in the memory, and wherein the plurality of modules comprising:
        a determination module for determining a usage pattern of a software code by using an Artificial Neural Network (ANN) technique;
        a comparison module for comparing the usage pattern with a set of pre-stored usage patterns of software applications, similar to the software code, wherein the usage pattern is compared by using a Deep Convolution Neural Network (Deep CNN) based transfer learning;
        an execution module for executing a set of test suites, on the software code, associated to at least one software application of the software applications, when a usage pattern of the at least one software application is matched with the usage pattern of the software code;
        an identification module for identifying a code snippet comprising a bug in the software code by,
            localizing the bug present in a line of code, of the software code, based on a stack trace, wherein the bug is localized upon determination of an occurrence of the bug in the software code, and wherein the occurrence of the bug is determined based on execution of the set of test suites, and determining the code snippet corresponding to the line of code by using a Deep Recurrent Neural Network (Deep RNN) technique;

a recommendation module for recommending a code patch, corresponding to the code snippet, from a ranked list of code patches determined by the Deep RNN technique; and a replacement module for replacing the code snippet with the code patch thereby removing the bug present in the software code.

8. The system of claim 7 is further configured to create a plurality of Artificial Intelligence (AI) based agents to gather the set of pre-stored usage patterns from the at least one software application coded in different programming language.

9. The system of claim 7, wherein the usage pattern is compared with the set of pre-stored usage patterns based on a plurality of attributes comprising number of requests in a predefined time, utilization of resources, number of threads, and number of connections created in the predefined time.

10. The system of claim 7 is further configured to map the set of code patches to a search space by using the Deep Convolution Neural Network (Deep CNN) and the Deep Recurrent Neural Network (Deep RNN) techniques to find the set of code patches based on the usage pattern, wherein the search space is a repository comprising the set of code patches written in different programming languages.

11. The system of claim 7 is further configured to translate the code patch into the programming language of the software code by using an auto encoder based on the transfer learning and the machine translation technique.

12. The system of claim 7, wherein the recommendation of the code patch is facilitated by using a reinforcement learning.

13. A non-transitory computer readable medium embodying a program executable in a computing device for removing a bug present in a software code, the program comprising a program code:

a program code for determining a usage pattern of a software code by using an Artificial Neural Network (ANN) technique;

a program code for comparing the usage pattern with a set of pre-stored usage patterns of software applications, similar to the software code, wherein the usage pattern is compared by using a Deep Convolution Neural Network (Deep CNN) based transfer learning;

a program code for executing a set of test suites, on the software code, associated to at least one software application of the software applications, when a usage pattern of the at least one software application is matched with the usage pattern of the software code;

a program code for identifying a code snippet comprising a bug in the software code by,
localizing the bug present in a line of code, of the software code, based on a stack trace, wherein the bug is localized upon determination of an occurrence of the bug in the software code, and wherein the occurrence of the bug is determined based on execution of the set of test suites, and
determining the code snippet corresponding to the line of code by using a Deep Recurrent Neural Network (Deep RNN) technique;

a program code for recommending a code patch, corresponding to the code snippet, from a ranked list of code patches determined by the Deep RNN technique; and a program code for replacing the code snippet with the code patch thereby removing the bug present in the software code.

* * * * *